Nov. 16, 1965 R. J. GROSS 3,218,007
PARACHUTE STABILITY IMPROVEMENTS
Filed Jan. 24, 1964 4 Sheets-Sheet 2

INVENTOR.
REINHOLD J. GROSS
BY
ATTORNEYS

Nov. 16, 1965 R. J. GROSS 3,218,007
PARACHUTE STABILITY IMPROVEMENTS
Filed Jan. 24, 1964 4 Sheets-Sheet 3

INVENTOR.
REINHOLD J. GROSS
BY
ATTORNEYS

INVENTOR.
REINHOLD J. GROSS
BY
ATTORNEYS

United States Patent Office 3,218,007
Patented Nov. 16, 1965

3,218,007
PARACHUTE STABILITY IMPROVEMENTS
Reinhold J. Gross, Dayton, Ohio, assignor to the United States of America as represented by the Secretary of the Air Force
Filed Jan. 24, 1964, Ser. No. 340,108
2 Claims. (Cl. 244—145)
(Granted under Title 35, U.S. Code (1952), sec. 266)

The invention described herein may be manufactured and used by or for the United States Government for governmental purposes without payment to me of any royalty thereon.

This invention relates to parachutes in general, and more particularly to canopy types having a plurality of flat circumferentially spaced gores or segments or panels secured together along their opposite edges to form a flat canopy sheet, having for an object the provision of an improved parachute canopy which is more stable, lighter in weight, with improved performance characteristics while reducing opening shock at higher drop speeds, and is easier and more economical to fabricate than conventional ring slot and ribbon parachute, or some solid fabric designs.

A further object is the provision of open parachute segments or gores for a parachute canopy having spaced radial side edges and spaced inner and outer end edges, with radially spaced connecting and reinforcing tie-tapes between the side edges of the open gores to prevent spreading thereof, in which said open gores or segments are adapted for insertion between conventional solid fabric gores to form a parachute canopy, or are adapted to be substituted for a predetermined number of spaced similar conventional solid gores or segments of a conventional solid fabric parachute canopy to improve the stability and performance characteristics thereof at higher drop speeds, with a reduction of the total weight and fabrication costs thereof, as compared with ribbon and ring slot canopies.

A further object of the invention is the provision of a parachute having a canopy comprising a plurality of "solid" or low porosity parachute fabric gores, and similar shaped more porous segment-shaped gores, alternately connected between the solid low porosity fabric gores, to form a parachute canopy having a plurality of circumferentially equally spaced solid low porosity fabric gores with radially spaced more porous similarly shaped gore segments therebetween.

A further object is the provision of a canopy fabricated from a plurality of circumferentially spaced fabric gores of predetermined porosity and similar gores of greater porosity secured therebetween.

A further object includes the provision of radially spaced reinforcing tie-means extending across the gores of greater porosity to tie the opposite radial side edges of the spaced gores of lesser porosity together.

A further object is the provision of a substantially hemispherical parachute canopy having a central vent opening comprising a flat circular sheet composed of a plurality of segmental gores spaced circumferentially around said vent opening and similarly shaped "open" segmental or gore members interposed therebetween in equal circumferentially spaced relation around the canopy, together with a plurality of reinforcing tie-members extending across the "open" gore members for tying the opposite radial edges of the "open" gore members together to limit spreading of the opposite side edges of the open gore members during deployment and descent of the parachute.

Another object is the provision of a segmental gore for parachute canopies in which the gore comprises diverging radial side edges having a plurality of equally spaced ribbons running longitudinally thereof parallel to a median line between the opposite side edges of the gore, and includes radially spaced transverse ribbons connected to the longitudinal ribbons, with the opposite ends of each of said transverse ribbons secured to the radial opposite side edges of the gore.

Other objects and advantages of the invention will become apparent from the following description and accompanying drawings in which like reference characters refer to like parts in the several figures.

FIG. 5 illustrates a further modified form of gore segment in which a partially solid fabric gore is formed with transverse vent openings spaced between the inner and outer ends of the gore.

FIGS. 6 and 7 are further fragmentary, somewhat schematic, plan views of additional slight modifications showing the vented or more porous gores composed of partially vented and partially solid fabric portions in which FIG. 6 shows the solid fabric portions adjacent the skirt, while FIG. 7 shows the solid fabric portion adjacent the apex and the vented or open portion in the skirt area.

Figure 8:
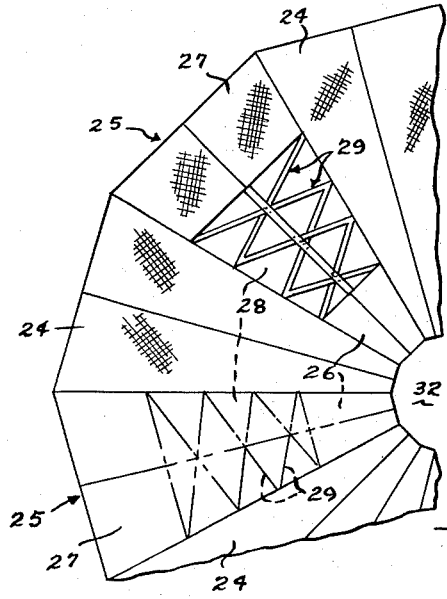
Figure 9:
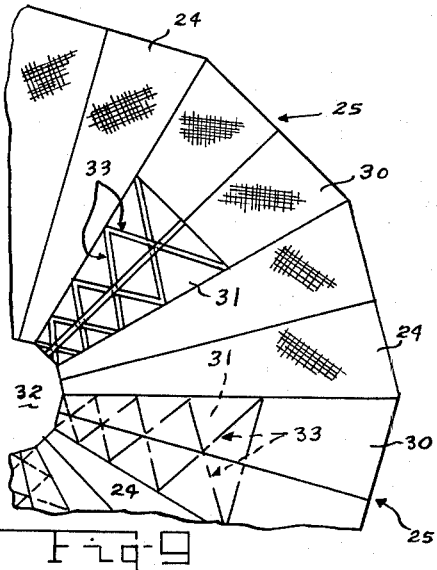

FIGS. 8 and 9 are similar schematic fragmentary plan views in which the vented or open portions of the gores include reinforcing cross tie tapes which extend diagonally across each other instead of parallel to the outer ends of the gores, FIG. 8 illustrating a construction in which the vented or more porous portions of the gores are located intermediate the two radially spaced solid fabric portions of the gores which are located adjacent the apex and adjacent the skirt portions of the panels, while in FIG. 9 the cross ribbons or tapes and the vented portions are located radially inward of the skirt portion.

Referring to the drawings the reference numeral 1 denotes a parachute canopy composed of radial gores or segments indicated generally at 2, having adjoining and secured edges, with shroud lines 3 depending from the lower or skirt portion, and preferably extending across the top of the canopy between the valleys 4 formed between the gores and across the apex vent 5.

The canopy comprises a plurality of solid fabric gores 6, having a predetermined porosity, fabricated from conventional parachute fabric. These are circumferentially substantially equally spaced around the vent opening 5 of the canopy to leave segmental shaped openings between the solid fabric gores. These openings are "filled" by similarly shaped segments or gores 7 having much greater porosity.

The segments or gores 7 have radially extending reinforced side edges 8 secured to the radial side edges of the solid fabric gores 6 and have inner and outer radially spaced ends 9 and 10.

In order to prevent the side edges 8 of the more porous segments 7 from spreading during deployment and descent, the more porous segments include a plurality of radially spaced, relatively narrow, tie-tapes 11 connected between the opposite radial side edges 8.

Figure 2:
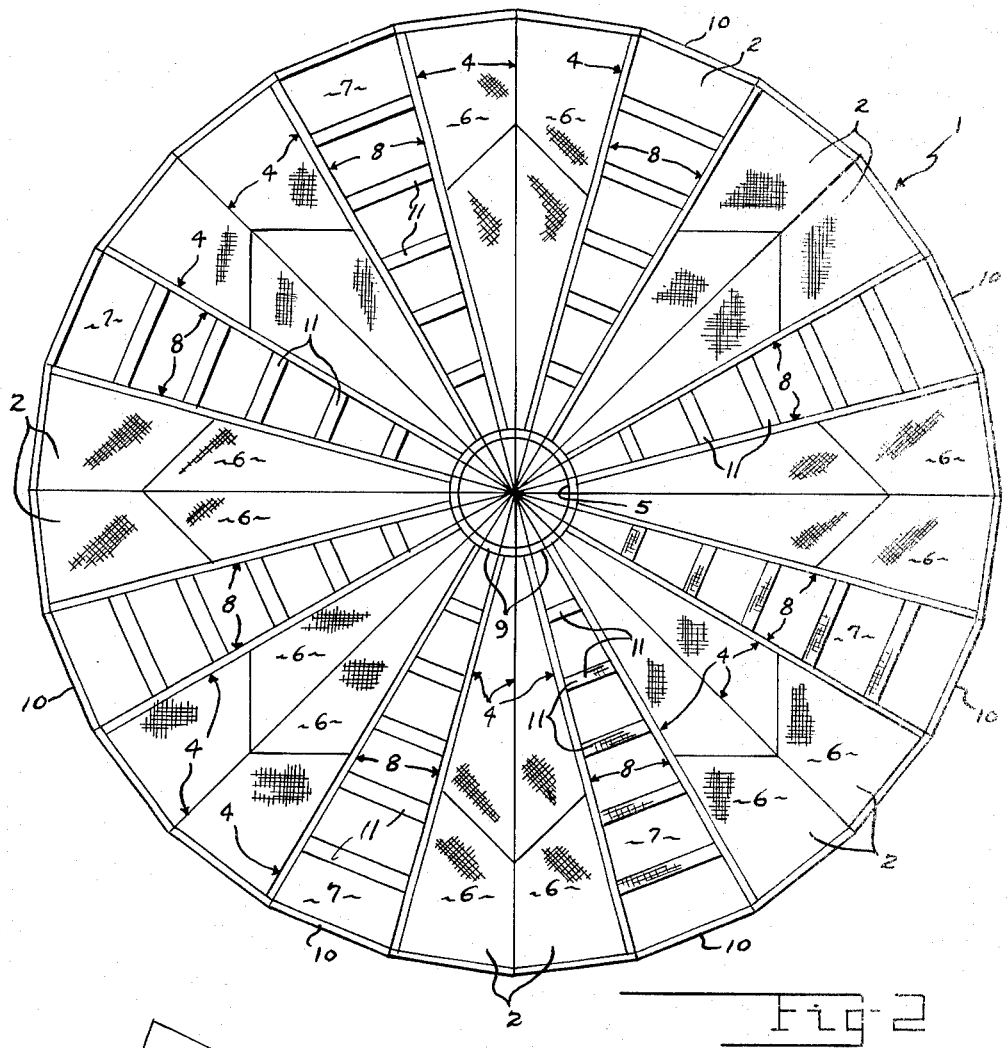
FIG. 2 is a somewhat schematic plan view of a canopy, such as shown in FIG. 1, incorporating the invention, and laid out in a flat plane.

Since the "solid," or less porous, segments 6 and the greater, or more porous, segments 7 are preferably similar in shape and size it is a simple matter to sew the radial edges of these segments 6 and 7 together to fabricate the canopy (such as shown in FIG. 2).

Figure 1:
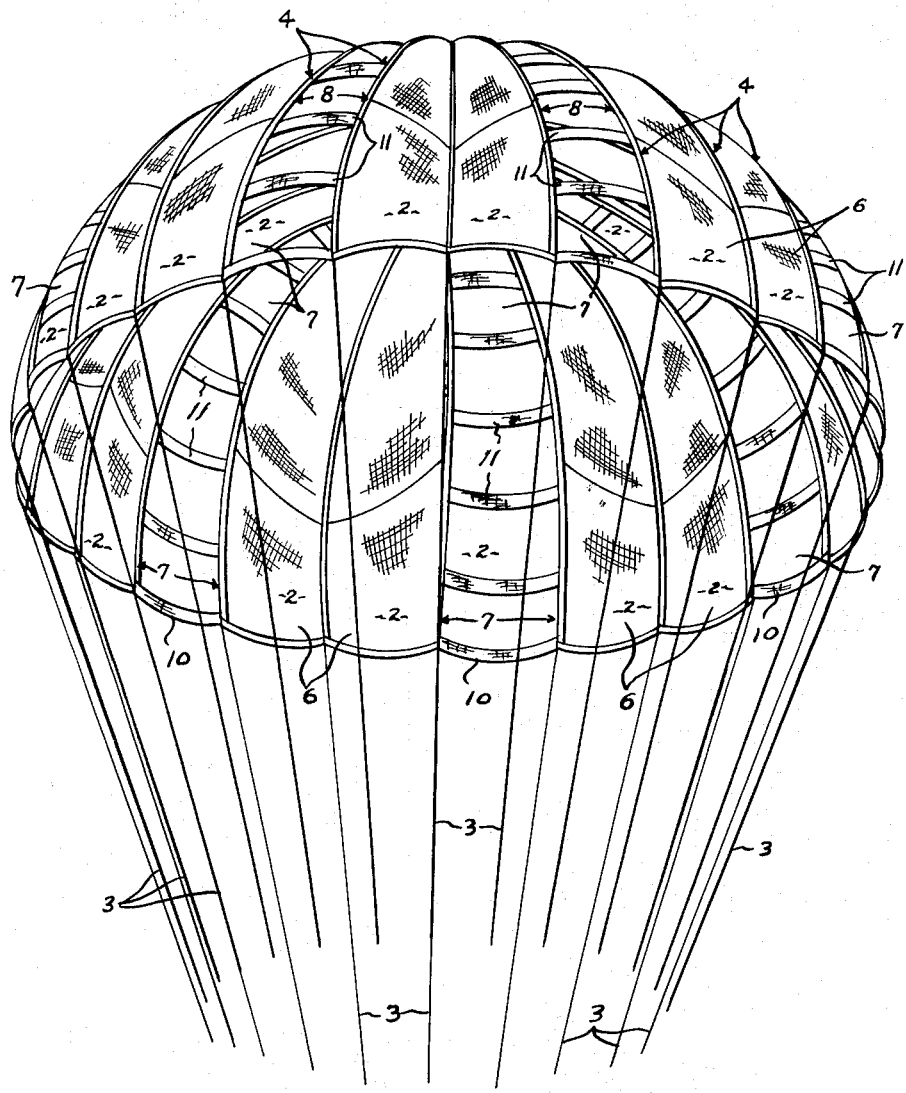
FIG. 1 is a perspective view illustrating a deployed and inflated canopy with shroud lines depending therefrom, and incorporating the invention.

As seen in FIGS. 1 and 2, the canopy as illustrated has 24 panels or gores in which a more porous panel or segment 7 disposed between and fastened to each pair of solid, or less porous, panels or segments 6, the porous, or open, panels 7 being circumferentially equally spaced around the vent opening 5 of the canopy. This arrangement necessarily requires the provision of a canopy in which the number of panels or segments should be divisible by three.

Figure 3:
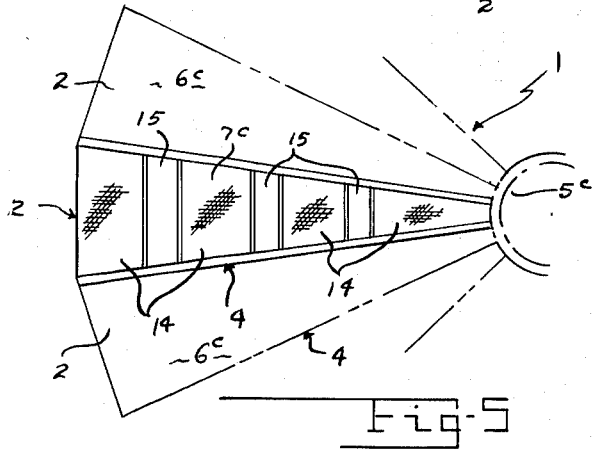
FIG. 3 is also a similar plan view of a parachute canopy incorporating the invention in a slightly modified manner, in which the open gore segments and solid fabric gore segments are disposed in pairs and substantially equal in shape and area.
Figure 3:
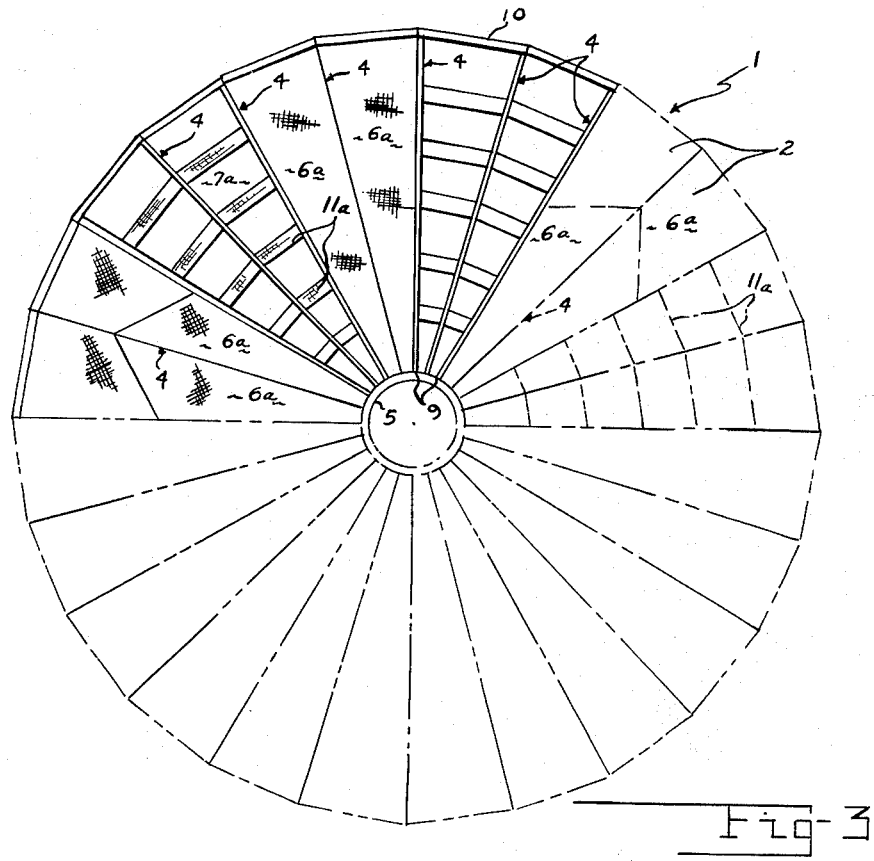

Of course, the canopy might be composed of only the spaced "solid" fabric radial panels or segments 6 having reinforced side edges and circumferentially equally spaced around the center of the canopy and then provided with reinforcing and connected narrow tie-tapes (such as 11) spaced radially outwarldy with their opposite ends firmly secured or sewed to the adjacent reinforced side edges of the spaced "solid" fabric panels 6. Also it is contemplated that, while the more porous panels 7 or segmental openings between the panels are uniformly or equally spaced circumferentially around the center of the canopy, the radial segments or panels 7 or openings may be of different widths than the "solid" segments or gores 6, or as seen in FIG. 3, in which the solid fabric panels 6a and the more porous panels 7a are alternately disposed in the canopy in pairs so that each pair of "solid" fabric panels 6a is positioned in the canopy between two spaced pairs of the panels 7a of greater porosity with the radial edges of the more porous panels 7a connected together by the tie-tapes 11a, similar to the narrow reinforcing tapes 11.

Figure 4:
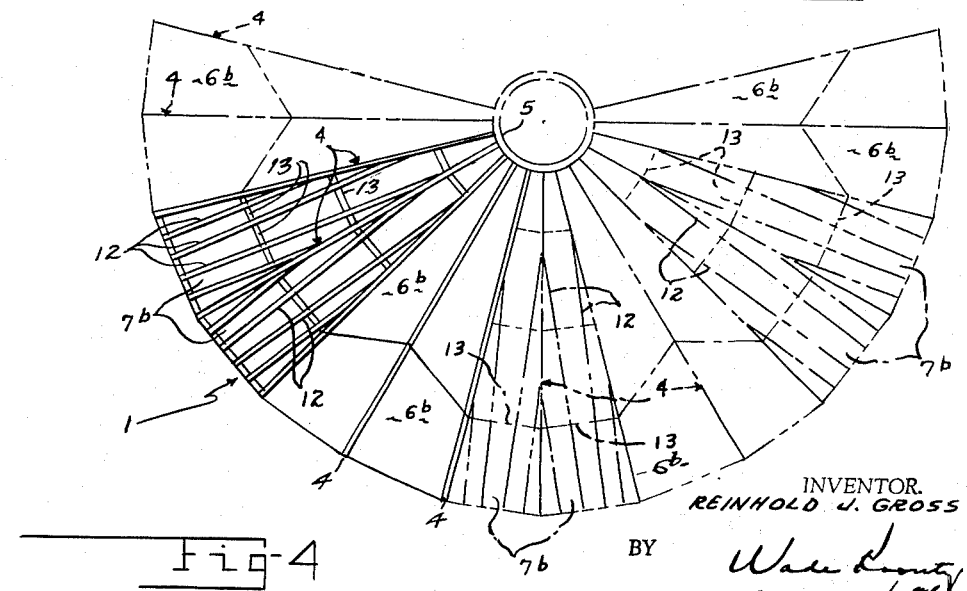
FIG. 4 is a similar fragmental plan view showing a modified type of open or more porous gore segments interposed between the solid fabric gore segments.

FIG. 4 shows a similar spacing of the panels 6b of lesser porosity and the panels 7b of materially greater porosity in which the panels 7b are each fabricated with a plurality of tapes 12 which are equally spaced in parallel relation to a median line through the center of the panel between the radial side edges thereof with these tapes or ribbons 12 tied together by reinforcing tie-tapes 13 extending transversely across the ribbons or tapes 12 and secured thereto, with the ends of the tapes 13 secured to the radial side edges of the porous panels 7b. In FIG. 5 the reference numeral 6c denotes the "solid" panels or segments of lesser porosity while 7c indicates the intermediate panels of greater porosity, in this case comprising fabric portions 14 with parallel transverse open slots 15 spaced at predetermined intervals between the apex vent 5c of the canopy and the periphery.

The improved parachute provides the combined advantages of the solid gore parachute and the vented type, such as the ring slot and ribbon canopies.

Figure 6:
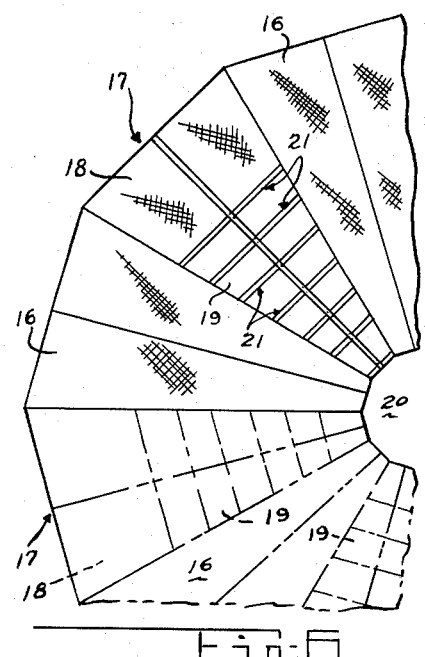
Figure 7:
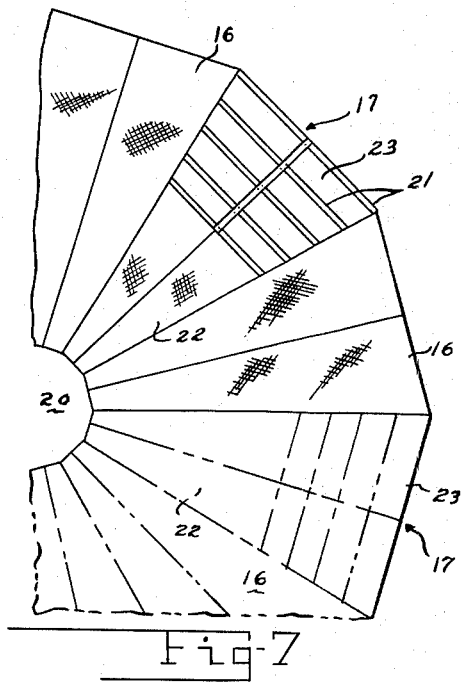

In the modifications shown in FIGS. 6 and 7 the solid fabric panels or gores are indicated at 16 while the vented or more porous gores are denoted at 17.

In FIG. 6 the vented gores or segments 17 each comprise a solid fabric portion 18, located in or adjacent the skirt portion while the vented or more porous areas 19 of the panels are located radially inward, or adjacent the apex 20, the sides of the more porous areas 19 being tied together by parallel cross-tapes 21 located between the inner and outer ends of the vented portions 19.

In FIG. 7 the vented or more porous panels 17 comprise inner solid fabric portions 22 and outer vented portions 23 which are located adjacent to, or in the skirt portion of the canopy.

Referring to FIG. 8 the solid fabric panels are indicated at 24 and the intermediate vented panels or gores are indicated at 25.

The vented panels in FIG. 8 comprise inner and outer solid fabric portions 26 and 27 respectively with the vented or more porous area 28 therebetween.

The vented area, in this form, is reinforced by diagonal cross-tie tapes 29 between the radial edges of the panels 25, rather than parallel cross tapes as shown in FIGS. 1 to 6. This arrangement distributes the strain during deployment and descent between the edges of the adjacent solid fabric gores in radial and circumferential directions instead of only a circumferential direction as seen in FIGS. 1 to 6.

FIG. 9 is a similar view in which the vented or more porous panels or gores 25 are fabricated to dispose the solid or less porous portions 30 adjacent the periphery, or in the skirt portion, while the more porous portions or areas 31 of the gores are located radially inward of the solid fabric portion 30, between the same and the apex 32, the diagonal or cross-tie tapes being indicated at 33.

The conventional solid fabric gore type of parachute provides quick opening with undesirable heavy opening shock, and also oscillates badly and its use is not desirable for deployment at high drop speeds, while the vented type such as the ring slot and the ribbon chute opens slowly and is quite stable during descent and provides low opening shock at high drop speeds but is quite expensive to fabricate.

By combining the desirable features of the two types of chutes just mentioned in a single canopy, according to the invention, a parachute is provided which has the desirable features of both the conventional solid fabric gore type and the conventional ring slot or ribbon chute type, while at the same time eliminating the undesirable feature of both. This provides a chute which is simple and less expensive to fabricate than the ribbon or ring slot chute but is extremely stable, has lower opening shock, and is safely deployable at higher drop speeds, but maintains the positive and reasonably fast opening characteristics, and has the less complicated and less expensive fabrication characteristics of the solid fabric canopy.

For purposes of exemplification a particular embodiment and several slight modifications of the invention have been shown and described to the best understanding thereof.

However, it will be apparent that minor changes and modifications in the arrangement and construction of the parts thereof may be resorted to without departing from the true spirit and scope of the invention as defined in the following claims.

I claim:
1. A parachute canopy having a center comprising, a plurality of similar segmental shaped gores circumferentially spaced around said center, said gores including uniformly circumferentially spaced-apart radial gores of solid fabric having a predetermined porosity and intermediate radial gores of materially greater porosity interposed between each of the solid fabric gores and secured thereto along the radial adges thereof to the radial edges of the gores of lesser porosity in which each of said segmental shaped gores of greater porosity comprises a plurality of closely spaced narrow fabric reinforcing strips therein extending outwardly of the gore in parallel relation to a median line extending longitudinally through the gore from the inner end to the outer end between the radial side edges thereof, and a plurality of transverse cross-tie members extending across said gores of greater porosity in predetermined spaced parallel relation to each other, between the inner and outer ends of the last mentioned gores in secured relation to the narrow fabric reinforcing strips with the opposite ends thereof connected to the opposite radial side edges of the last mentioned gores of greater porosity.

2. A parachute canopy having a central axis comprising, a plurality of similar segmental shaped panels circumferentially arranged around said center, said panels including spaced apart radial panels of solid fabric and intermediate panels of materially greater porosity interposed therebetween and secured thereto along the radial side edges of the solid fabric panels, said intermediate panels comprising solid fabric portions extending inwardly from one end thereof between the aforesaid solid fabric panels, and a plurality of transversely extending connecting tie-tapes between the opposite radial side edges of the intermediate panels in radially spaced relation to said center and between said solid fabric portions thereof and the other ends of said intermediate panels in which said transverse tie-tapes between the opposite radial side edges of said intermediate panels are inclined across each other with the ends thereof connected to the opposite radial side edges of the panels.

References Cited by the Examiner

UNITED STATES PATENTS

| | | | |
|---|---|---|---|
| 2,641,424 | 6/1953 | Moran | 244—145 |
| 2,730,315 | 1/1956 | Fogal et al. | 244—145 |
| 3,136,508 | 6/1964 | Sepp | 244—145 |

FOREIGN PATENTS

| | | |
|---|---|---|
| 874,034 | 4/1942 | France. |
| 978,042 | 11/1950 | France. |

MILTON BUCHLER, *Primary Examiner.*

FERGUS S. MIDDLETON, *Examiner.*